(12) United States Patent
Kruglick (10) Patent No.: US 9,489,774 B2
(45) Date of Patent: Nov. 8, 2016

(54) THREE DIMENSIONAL USER INTERFACE IN AUGMENTED REALITY

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/235,958

(22) PCT Filed: May 16, 2013

(86) PCT No.: PCT/US2013/041397
§ 371 (c)(1),
(2) Date: Jan. 29, 2014

(87) PCT Pub. No.: WO2014/185920
PCT Pub. Date: Nov. 20, 2014

(65) Prior Publication Data
US 2015/0221132 A1    Aug. 6, 2015

(51) Int. Cl.
| | |
|---|---|
| G06T 19/00 | (2011.01) |
| H04N 13/04 | (2006.01) |
| G06F 3/0481 | (2013.01) |
| G06F 3/0484 | (2013.01) |

(52) U.S. Cl.
CPC ......... *G06T 19/006* (2013.01); *G06F 3/04815* (2013.01); *G06F 3/04842* (2013.01); *H04N 13/0402* (2013.01); *G06T 2200/04* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 6,798,412 B2 | 9/2004 | Cowperthwaite | |
| 7,167,779 B2 * | 1/2007 | Kashiwada et al. | 701/1 |
| 7,379,077 B2 | 5/2008 | Bani-Hashemi et al. | |
| 7,487,468 B2 * | 2/2009 | Tanaka et al. | 715/863 |
| 7,551,770 B2 * | 6/2009 | Harman | G06T 7/0022 |
| | | | 345/419 |

(Continued)

FOREIGN PATENT DOCUMENTS

WO    2012054231 A2    4/2012

OTHER PUBLICATIONS

Z. Szalavari, D. Schmalstieg, A. Fuhrmann, M. Gervautz, ""Studierstube": An Environment for Collaboration in Augmented Reality", 1998, Springer-Verlag, Virtual Reality, vol. 3, Issue 1, pp. 37-48.*

(Continued)

*Primary Examiner* — Robert Bader
(74) *Attorney, Agent, or Firm* — Moritt Hock & Hamroff LLP; Steven S. Rubin, Esq.

(57) ABSTRACT

Technologies are generally described for a three dimensional user interface in augmented reality. In some examples, a method for generating a virtual object in a display area may include generating a first virtual object in the display area with use of at least two viewing cones generated by a display. The method may further include receiving spatial data that relates to a location of a real object in the display area and determining that the real object is interfering with at least one of the viewing cones. The method may further include generating a second virtual object corresponding to the first virtual object. The second virtual object may be located between the display and the location of the real object.

19 Claims, 9 Drawing Sheets

(56) References Cited

U.S. PATENT DOCUMENTS

| | | | | |
|---|---|---|---|---|
| 7,940,285 | B2* | 5/2011 | Would | G06F 3/0482 345/629 |
| 8,232,990 | B2 | 7/2012 | King et al. | |
| 2008/0136785 | A1* | 6/2008 | Baudisch | G06F 3/0488 345/173 |
| 2009/0128449 | A1* | 5/2009 | Brown et al. | 345/8 |
| 2011/0128555 | A1 | 6/2011 | Rotschild et al. | |
| 2011/0221668 | A1* | 9/2011 | Haddick | G02B 27/017 345/156 |
| 2014/0282269 | A1* | 9/2014 | Strutt | G06F 3/04886 715/863 |
| 2014/0320615 | A1* | 10/2014 | Kuribayashi | G09G 3/003 348/54 |

OTHER PUBLICATIONS

Erick Mendez, Denis Kalkofen, Dieter Schmalstieg, "Interactive Context-Driven Visualization Tools for Augmented Reality", 2006, IEEE, ISMAR '06 Proceedings of the 5th IEEE and ACM International Symposium on Mixed and Augmented Reality, pp. 209-218.*
Denis Kalkofen, Erick Mendez, Dieter Schmalstieg, "Comprehensible Visualization for Augmented Reality", Mar. 2009, IEEE, IEEE Transactions on Visualization and Computer Graphics, vol. 15, No. 2, pp. 193-204.*
Blaine Bell, Steven Feiner, Tobias Hollerer, "View Management for Virtual and Augmented Reality", Nov. 14, 2001, ACM, UIST '01 Proceedings of the 14th annual ACM Symposium on User Interface Software and Technology, pp. 101-110.*
Taehee Lee, Tobias Hollerer, "HandyAR: Markerlkess Inspection of Augmented Reality Objects Using Fingertip Tracking", Oct. 13, 2007, IEEE, 11th IEEE International Symposium on Wearable Computers, pp. 83-90.*
Romer Rosales, Stan Sclaroff, "3D Trajectory Recovery for Tracking Multiple Objects and Trajectory Guided Recognition of Actions", Jun. 25, 1999, IEEE, IEEE Computer Society Conference on Computer Vision and Pattern Recognition, 1999, vol. 2, pp. 117-123.*
J. Nilsson, P. Clarberg, B. Johnsson, J. Munkberg, J. Hasselgren, R. Toth, M. Salvi, T. Akenine-Möller, "Design and Novel Uses of Higher-Dimensional Rasterization", Jun. 25, 2012, Eurographics Association, EGGH-HPG '12 Proceedings of the Fourth ACM SIGGRAPH / Eurographics Conference on High-Performance Graphics, pp. 1-11.*
Seppo Ayravainen, "3D Magic Lenses, Magic Lights, and their application for immersive building services information and visualization", Mar. 1, 2003, Helsinki University of Technology, Telecommunications software and multimedia laboratory.*
Jurrian D. Mulder, "Occlusion in Mirror-Based Co-Located Augmented Reality Systems", Feb. 2006, MIT, Presence, vol. 15, No. 1, pp. 93-107.*
Anton Fuhrmann, Gerd Hesina, Francois Faure, Michael Gervautz, "Occlusion in collaborative augmented environments", 1999, Elsevier Science Ltd., Computers & Graphics 23, pp. 809-819.*
Klaus Hopf, Paul Chojecki, Frank Neumann and David Przewozny, "Novel Autostereoscopic Single-User Displays with User Interaction", Oct. 17, 2006, SPIE, Proc. SPIE 6392, Three-Dimensional TV, Video, and Display V.*
Daniel Vogel, Ravin Balakrishnan, "Occlusion-Aware Interfaces", Apr. 15, 2010, ACM, CHI 2010, pp. 263-272.*
Argelaguet, F. and Andujar, C., "Improving 3D Selection in VEs through Expanding Targets and Forced Disocclusion," Lecture Notes in Computer Science, vol. 5166, 2008, pp. 45-57.
Miyazaki, R. and Itoh, T. "An Occlusion-Reduced 3D Hierarchical Data Visualization Technique," 13th International Conference Information Visualisation, Jul. 15-17, 2009, pp. 38-43.
Sato, K. et al., "Consideration of Improvement of Electro-holographic Stereogram," Proc. SPIE 7957, Practical Holography XXV: Materials and Applications, 795713, Feb. 7, 2011.
Osanlou, A., "Production of High-resolution Small-sized Holographic Stereograms," Optical Engineering, vol. 50, Issue 09, 2011, pp. 091314-091314-3.
Benko, H. and Feiner, S., "Balloon Selection: A Multi-finger Technique for Accurate Low-fatigue 3D Selection," IEEE Symposium on 3D User Interfaces, Mar. 10-11, 2007, pp. 79-86.
Lambooij, M. et al., "Visual Discomfort and Visual Fatigue of Stereoscopic Displays: A Review," Journal of Imaging Technology and Science, vol. 53, Issue 3, 2009, pp. 030201-1-030201-14.
Ukai, K. and Howarth, P.A., "Visual Fatigue Caused by Viewing Stereoscopic Motion Images: Background, Theories, and Observations," Displays, vol. 29, Issue 2, Mar. 2008, pp. 106-116.
Simonite, T., "Microsoft's Plan to Bring About the Era of Gesture Control,"Computing News, Updated on Oct. 22, 2012, accessed at http://www.technologyreview.com/news/429660/microsofts-plan-to-bring-about-the-era-of-gesture-control/, accessed on Dec. 4, 2013, pp. 1-3.
Greene, K., "Meet the Nimble-Fingered Interface of the Future," Computing News, Updated on Oct. 3, 2012, accessed at http://www.technologyreview.com/news/429426/meet-the-nimble-fingered-interface-of-the-future/, accessed on Dec. 4, 2013, pp. 1-3.
Senior, T., "Leap motion controller looks better than Kinect, shown working with Half-Life 2," updated on Jul. 23, 2012, accessed at http://www.pcgamer.com/2012/07/23/leap-motion-controller-looks-better-than-kinect-shown-working-with-half-life-2/, accessed on Dec. 4, 2013, pp. 1-19.
Fairhead, H., "Kinect Tracks a Single Finger With a New SDK," updated on Oct. 4, 2012, accessed at http://www.i-programmer.info/news/194-kinect/4891-kinect-tracks-a-single-finger-with-a-new-sdk.html, accessed on Dec. 4, 2013, pp. 1-4.
Albinsson, P.A. and Zhai, S. "High Precision Touch Screen Interaction," Proceedings of the SIGCHI Conference on Human Factors in Computing Systems, 2003, pp. 105-112.
Barakonyi, I. et al., "Collaborative Work with Volumetric Data Using Augmented Reality Videoconferencing," Proceedings of the 2nd IEEE/ACM International Symposium on Mixed and Augmented Reality, 2003, p. 333.
Smith, S. P. et al., "Relative and Absolute Mappings for Rotating Remote 3D Objects on Multi-touch Tabletops," In Proceedings of the 25th BCS Conference on Human-Computer Interaction, 2011, pp. 299-308.
Schwerdtner, A. et al., "A New Approach to Electro-holographic Displays for Large Object Reconstructions," Digital Holography and Three-Dimensional Imaging, 2007, paper PMA5.
McHugh, M., "Google Glasses Are Just the Beginning: Why Wearable Computing Is the Future," updated on Jul. 6, 2012, accessed at http://www.digitaltrends.com/computing/google-glasses-are-just-the-beginning-why-wearable-computing-is-the-future/, accessed on Dec. 4, 2013, pp. 1-4.
Arthur, C., "UK company's 'augmented reality' glasses could be better than Google's," updated on Sep. 10, 2012, accessed at http://www.guardian.co.uk/technology/2012/sep/10/augmented-reality-glasses-google-project, accessed on Dec. 4, 2013, pp. 1-4.
Cardinal, D., "Google Glass alternative TTP offers a straight-forward, more-immersive choice," updated on Sep. 11, 2012, accessed at http://www.extremetech.com/extreme/135907-google-glass-alternative-ttp-offers-a-straight-forward-more-immersive-choice, accessed on Dec. 4, 2013, p. 1.
Wasserman, T., "Apple Patent Hints at Google Glass Competitor," updated on Jul. 5, 2012, accessed at http:// mashable.com/2012/07/05/apple-patent-google-glass/, accessed on Dec. 4, 2013, pp. 1-5.
"Project Glass," accessed at https://plus.google.com/+projectglass/posts, accessed on Dec. 4, 2013, p. 1.
Stanley, M. et al., "3D Electronic Holography Display System Using a 100-megapixel Spatial Light Modulator," Optical Design and Engineering , Proceedings of the SPIE , vol. 5249, 2004, pp. 297-308.
Xu, X. et al., "Full High-definition Digital 3D Holographic Display and Its Enabling Technologies," Optical Data Storage, Proceedings of the SPIE, Jun. 11, 2010, pp. 77301C-1-77301C-10.
Slinger, C. et al., "Computer-generated Holography as a Generic Display Technology," Computer, vol. 38, Issue 08, Aug. 2005, pp. 46-53.

(56) References Cited

OTHER PUBLICATIONS

International Search Report and Written Opinion for International Patent Application No. PCT/US2013/041397 mailed Nov. 22, 2013.

Lok, B. et al., "Incoporating Dynamic Real Objects into Immersive Virtual Environments," Proceedings of the 2003 symposium on Interactive 3D graphics, 2003, pp. 31-40.

* cited by examiner

THREE DIMENSIONAL USER INTERFACE IN AUGMENTED REALITY

CROSS-REFERENCE TO RELATED APPLICATION

This application is a U.S. national stage filing under U.S.C. §371 of International Application No. PCT/US2013/41397 filed on May 16, 2013, the entirety of which is hereby incorporated by reference.

BACKGROUND

Unless otherwise indicated herein, the materials described in this section are not prior art to the claims in this application and are not admitted to be prior art by inclusion in this section.

In conventional augmented reality systems, a user's view of the real world is enhanced or augmented with additional information generated by a computing device. Augmented reality may include projection of three dimensional ("3D") displays either by projection in front of both eyes or through 3D displays.

SUMMARY

According to some examples, methods for generating a virtual object in a display area are generally described. The methods may include generating a first virtual object in the display area with use of at least two viewing cones. The viewing cones may be generated by a display. The methods may further include receiving spatial data that relates to a location of a real object in the display area. The methods may further include determining that the real object is interfering with at least one of the viewing cones. The methods may further include generating a second virtual object corresponding to the first virtual object. The second virtual object may be located between the display and the location of the real object.

According to other examples, systems effective to generate a virtual object are generally described. The systems may include a memory, a display, a spatial detector, and a processor. The display may include a display area. The spatial detector may be configured to detect spatial data that relates to a location of a real object in the display area. The processor may be configured to be in communication with the memory, the display and the spatial detector. The processor may further be configured to generate a first virtual object in the display area with use of at least two viewing cones generated by the display. The processor may further be configured to receive the spatial data and determine that the real object interferes with at least one of the viewing cones. The processor may further be configured to generate a second virtual object that corresponds to the first virtual object. The second virtual object may be located between the display and the location of the real object.

According to further examples, systems effective to generate a virtual object are generally described. The systems may include a memory, a spatial detector, and a processor. The spatial detector may be configured to detect spatial data that relates to a location of a real object in the display area. The processor may be configured to be in communication with the memory and the spatial detector. The processor may further be configured to generate first virtual object data. The first virtual object data may be effective to control a display to generate a first virtual object in the display area with use of at least two viewing cones. The viewing cones may be generated by the display. The processor may further be configured to receive the spatial data. The processor may further determine that the real object interferes with at least one of the viewing cones. The processor may further be configured to generate second virtual object data. The second virtual object data may be effective to control the display to generate the second virtual object in the display area at a location between the display and the location of the real object. The second virtual object may correspond to the first virtual object.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged in accordance with at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies including methods, apparatus, systems, devices, and computer program products related to a three dimensional user interface in augmented reality.

Briefly stated, technologies are generally described for a three dimensional user interface in augmented reality. In some examples, a method for generating a virtual object in a display area may include generating a first virtual object in the display area with use of at least two viewing cones generated by a display. The method may further include receiving spatial data that relates to a location of a real object in the display area and determining that the real object is interfering with at least one of the viewing cones. The method may further include generating a second virtual object corresponding to the first virtual object. The second virtual object may be located between the display and the location of the real object.

Figure 1:
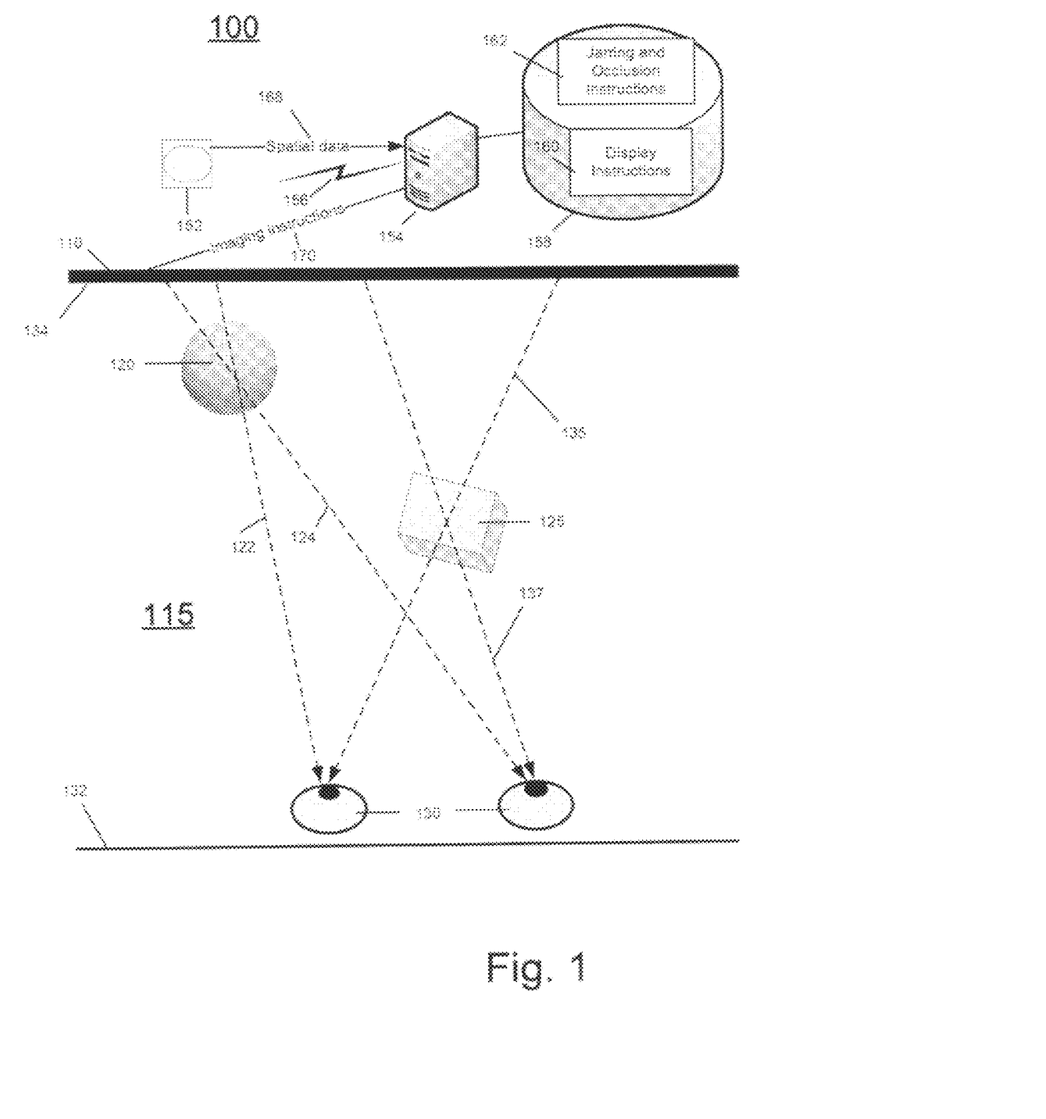
FIG. 1 illustrates an example system that can be utilized to implement a three dimensional user interface in augmented reality.

FIG. 1 illustrates an example system 100 that can be utilized to implement a three dimensional user interface in augmented reality, arranged in accordance with at least some embodiments presented herein. As depicted, system 100 may include a spatial locator 152 and a free space three dimensional ("3D") display 110. Free space 3D display 110 may compute pre-diffracted wave fronts. The wave fronts may be output through Fourier transforming optics to generate virtual images. In other examples, 3D display 110 may use polarizing or shutter glasses to route different images to each eye. Free space 3D display 110 may include a first boundary 134 and a second boundary 132. First boundary 134 and second boundary 132 may define a 3D display area 115. Spatial locator 152 may be calibrated to detect movement within 3D display area 115. Free space 3D display 110 may be configured to generate a first virtual object 120 by generating two or more virtual viewing cones 122 and 124. Free space 3D display 110 may be configured to generate second virtual object 125 by generating two or more virtual viewing cones 135 and 137. A viewer 130 may be able to view first virtual object 120 and/or second virtual object 125 in 3D display area 115.

At least some of the elements of system 100 may be arranged to be in communication with a processor 154 through a communication link 156. In some examples, processor 154 may be adapted to be in communication with a memory 158 that may include display instructions 160 and jarring and occlusion instructions 162 stored therein. Processor 154 may be configured, such as by display instructions 160 and jarring and occlusion instructions 162, to control at least some of the operations/actions/functions described below.

Display instructions 160 may include data relating to generating the image of three dimensional objects. Jarring and occlusion instructions 162 may include instructions for modifying data for generating the image of three dimensional objects into data for generating the image of a corresponding two dimensional object. Jarring and occlusion instructions 162 may also include data relating to an animation that may be used when modifying the generation of an image.

Processor 154 may, such as by executing display instructions 160, provide imaging instructions 170 to free space 3D display 110. In response to imaging instructions 170, free space 3D display 110 may generate virtual viewing cones 122 and 124 which, in turn, generate first virtual object 120. Similarly, free space 3D display 110 may generate virtual viewing cones 135 and 137 to generate second virtual object 125. Data relating to virtual objects 120 and/or 125 may be stored in memory 158.

Processor 154 may, such as by executing jarring and occlusion instructions 162, and in response to spatial data 168 received from spatial locator 152, detect whether one or more virtual viewing cones 122, 124, 135, 137 is interfered with by a real object. In one example, a real object may be interfering with virtual viewing cones corresponding to second virtual object 125. In response to the detection, processor 154 may generate imaging instructions 170 to effectively modify the generation of second virtual object 125 in 3D display area 115 to account for the interference as described in further detail below.

Figure 2:
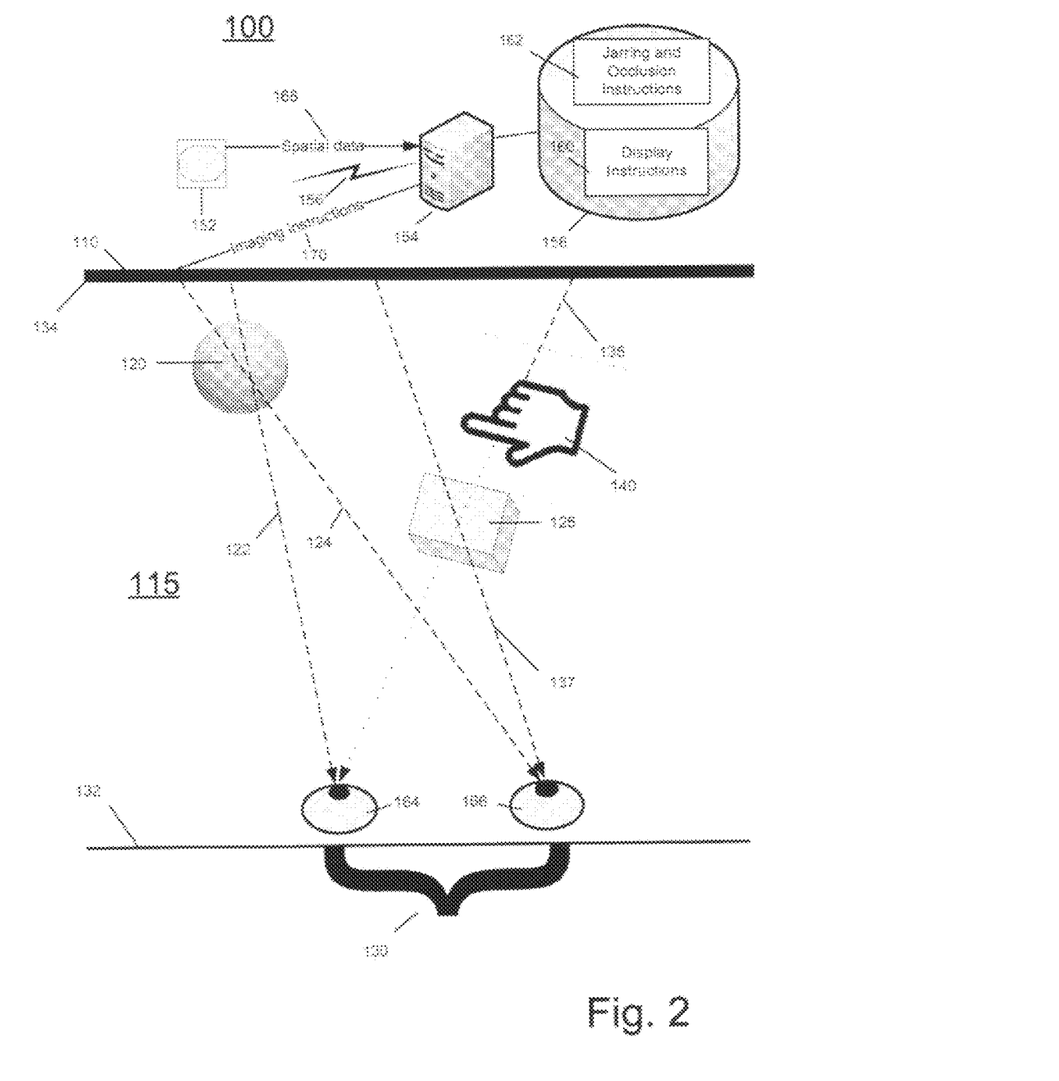
FIG. 2 illustrates the example system of FIG. 1 further illustrating an interfered viewing cone.

FIG. 2 illustrates example system 100 further illustrating an interfered viewing cone, arranged in accordance with at least some embodiments presented herein. System 100 depicted in FIG. 2 is substantially similar to system 100 of FIG. 1, with additional details. Those components in FIG. 2 that are labeled identically to components of FIG. 1 will not be described again for the purposes of clarity.

As shown in the example of FIG. 2, a real object 140 may interface with system 100. Real object 140 may be, for example, a hand, a foot, a finger or any other animate or inanimate object. Real object 140 may be used by viewer 130 to point to, or interact with, a virtual object or area within 3D display area 115. For example, viewer 130, having two eyes 164, 166, may want to interact with first virtual object 120. Viewer 130 may move a hand or any other real object 140 within 3D display area 115 towards first virtual object 120. Spatial locator 152 may detect the location and movement of real object 140 and generate spatial data 168 in response. Processor 154 may receive spatial data 168 and display instruction 160. Display instructions 160 may indicate where virtual viewing cones 122, 124, 135 and 137 are being generated.

Based on spatial data 168 and display instructions 160, processor 154 may determine that real object 140 has interfered with virtual viewing cone 135 (as illustrated by the change in width of dotted lines), or that real object 140 is travelling along a path that would interfere, with virtual viewing cone 135. For example, real object 140 is shown in the example interfering with virtual viewing cone 135 between free space 3D display 110 and viewer 130—or more specifically viewer eye 164. In response to the determination, processor 154 may execute jarring and occlusion instructions 162. Processor 154 may generate imaging instructions 170 based on spatial data 168, display instructions 160 and jarring and occlusion instructions 162. Imaging instructions 170 may effectively modify the generation of second virtual object 125 to account for the interference in 3D display area 115 as described in further detail below.

Figure 3:
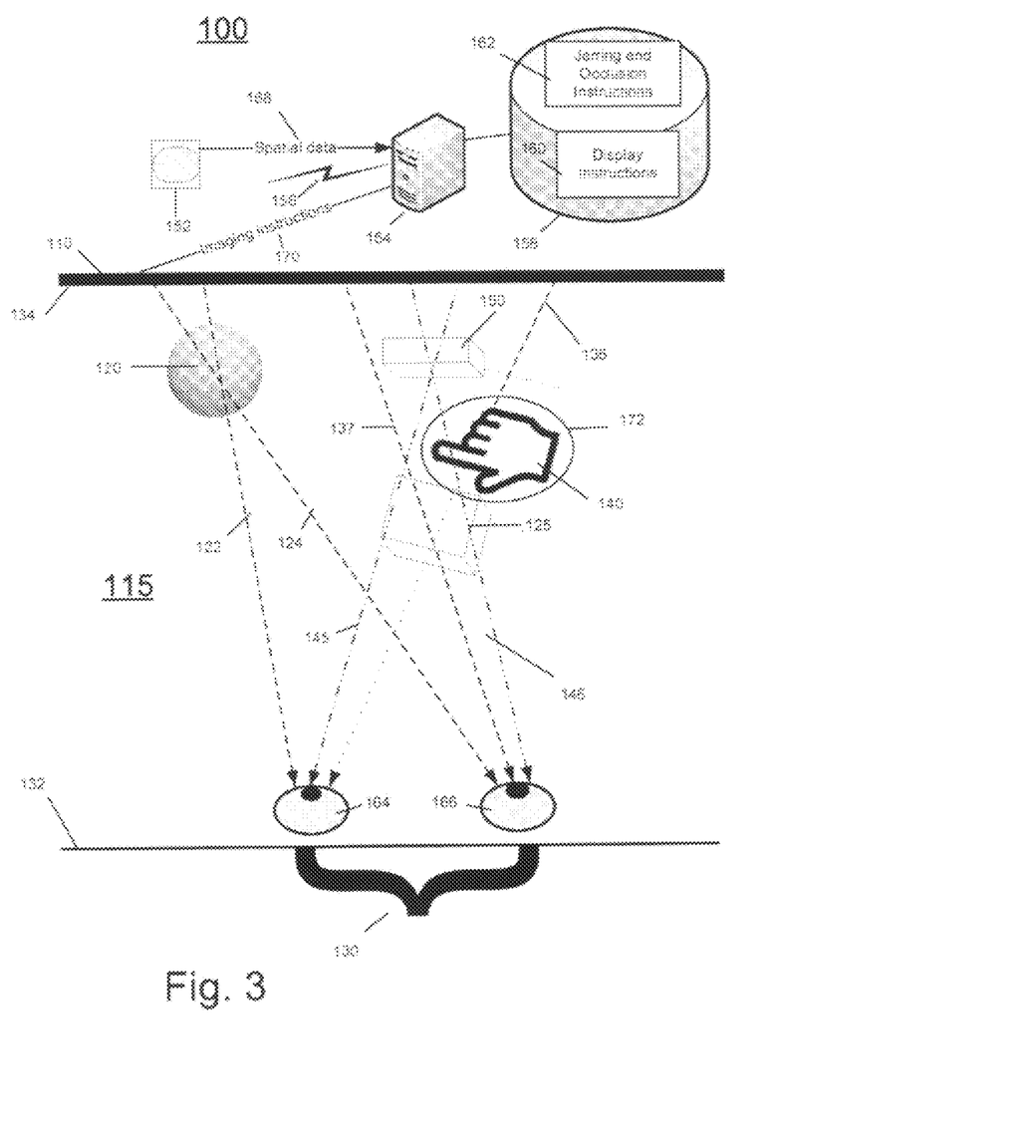
FIG. 3 illustrates the example system of FIG. 1 further illustrating a virtual two dimensional image.

FIG. 3 illustrates example system 100 further illustrating a virtual two dimensional image, arranged in accordance with at least some embodiments presented herein. System 100 depicted in FIG. 3 is substantially similar to system 100 of FIG. 1 and FIG. 2, with additional details. Those components in FIG. 3 that are labeled identically to components of FIG. 1 and FIG. 2 will not be described again for the purposes of clarity.

Based on spatial data 168 and display instructions 160, processor 154 may determine that real object 140 has interfered with virtual viewing cone 135, or travelled along a path that would interfere, with virtual viewing cone 135. In response to the determination, processor 154 may execute jarring and occlusion instructions 162. Processor 154 may, such as by executing jarring and occlusion instructions 162, identify an interfered visual area 172. Interfered visual area 172 may be identified as a range of locations in 3D display area 115 where real object 140 is interfering with virtual viewing cone 135 plus some additional buffer range of locations. Processor 154 may then identify virtual objects whose generation may be affected because of the interference of virtual viewing cone 135. In the example, generation of second virtual object 125 is affected.

In contrast, first virtual object 120 may not be identified as an object whose generation is affected by the interference of virtual viewing cone 135. First virtual object 120 may not be identified because first virtual object 120 may be closer to free space 3D display 110 than real object 140, and/or first virtual object 120 and virtual viewing cones 122, 124 may not be within interfered visual area 172. Consequently, processor 154, executing jarring and occlusion instructions 162 may not select first virtual object 120 and not generate imaging instructions 170 to modify the generation of first virtual object 120 in 3D display area 115.

Interfered visual area 172 may identify a range of locations from real object 140 so that interfered visual area 172 includes a buffer region that surrounds real object 140. For example, interfered visual area 172 may be a circle with a one centimeter radius surrounding real object 140. In other examples, interfered visual area 172 may include a convex hull of real object 140. Incorporating the buffer region of interfered visual area 172 may prevent sudden transitions between processor 154 executing display instructions 160 to generate virtual objects and processor 154 executing jarring and occlusion instructions 162 in response to interfered cones.

Processor 154 may, such as by executing jarring and occlusion instructions 162, generate imaging instructions 170. Imaging instructions 170 may cause free space 3D display 110 to generate virtual viewing cones 145 and 146. Virtual viewing cones 145 and 146 may replace interfered virtual viewing cone 135 and virtual viewing cone 137 and generate a virtual object or a virtual two dimensional ("2D") image 150 corresponding to second virtual object 125. Virtual 2D image 150 may be closer to free space 3D display 110 than real object 140 so as to not be interfered by real object 140. Virtual 2D image 150 may be equivalently scaled to second virtual object 125 or may be scaled bigger or smaller. Imaging instructions 170 may provide free space 3D display with instructions for an animation to accompany the generation of virtual 2D image 150. In one example animation, second virtual object 125 may compress to virtual 2D image 150 over a path as second virtual object 125 approaches interfering real object 140. Other example animations may include compression of the 3D virtual object, change of a color of the virtual object, performance of a color overlay of the virtual object, or display of a movement of the 3D virtual object to the location of the 2D virtual image.

Virtual objects selected by processor 154 may be selected whole, even if the virtual object has a size larger than interfered visual area 172 and significant parts of the pertinent virtual object are outside of the interfered viewing cone. The virtual 2D image may correspond to the whole virtual object. In another example, part of a virtual object that has a size larger than interfered visual area 172 may be selected by processor 154 whose generation is affected by the interference of an interfered viewing cone. In this example, imaging instructions 170 may be generated for the portion of the virtual object that is affected by the interference of the interfered viewing cone and not for other portions of the object. The virtual 2D image may correspond to the portion of the virtual object affected by the interference.

Over time, a location of interfered visual area 172 may change. For example, real object 140 may move within 3D display area 115 or be removed from 3D display area 115. When interfered visual area 172 changes, such as because of movement of real object 140, virtual objects that may have been in interfered visual area 172 may no longer be in interfered visual area 172. For example, a user may remove his hand 140 from 3D display area 115. In response to the movement, processor 154 may determine that interfered visual area 172 no longer would interfere with virtual viewing cones 135 and 137. Processor 154, by executing display instructions 160 and jarring and occlusion instructions 162, may re-generate virtual viewing cones 135, 137 to again re-generate second virtual object 125 and stop generating imaging instructions 170. Processor 154 may further generate an animation to accompany the re-generation of second virtual object 125.

Among other possible benefits, a three dimensional user interface in augmented reality in accordance with the present disclosure may prevent a jarring parallax. Such a jarring parallax may be caused by a real object inappropriately blocking an image of a virtual 3D object to one eye of a viewer while the other eye of the viewer can still see the image of the virtual 3D object. In augmented reality, the 3D object should be closer to the viewer than the real object and thus not blocked at all. Jarring parallax may cause discomfort or headaches for viewers as their eyes oscillate back and forth to focus on the near and far unmatched images. The parallax may also cause eye fatigue. The present disclosure may prevent such eye oscillations.

Figure 4:
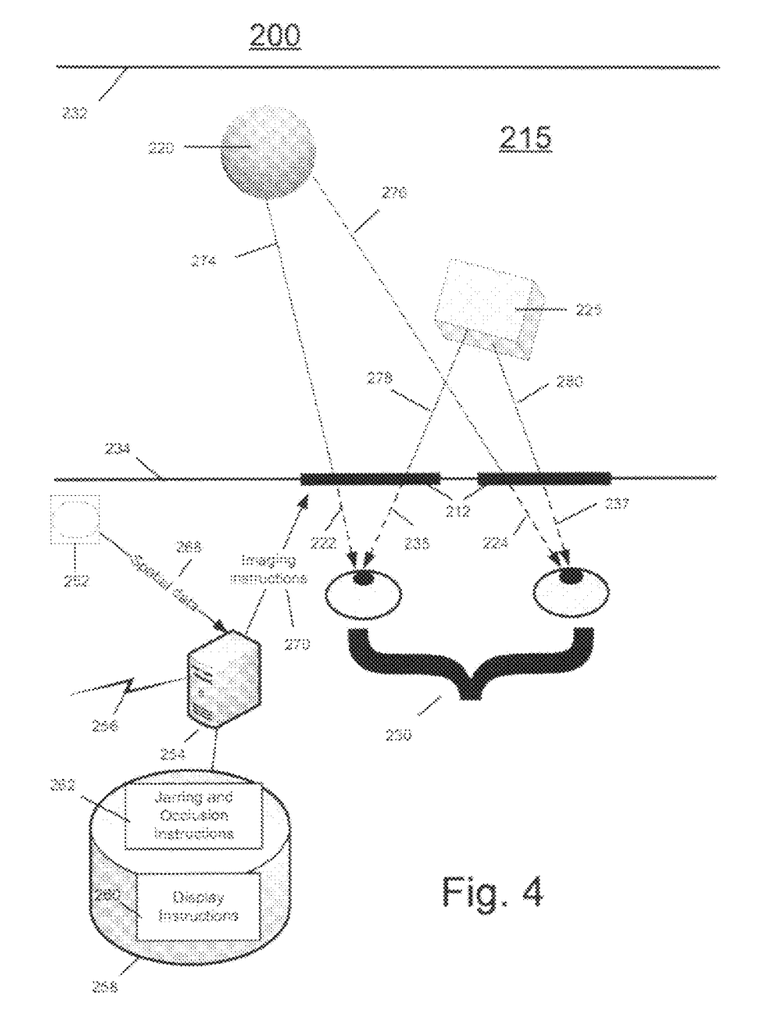
FIG. 4 illustrates an example system that can be utilized to implement a three dimensional user interface in augmented reality.

FIG. 4 illustrates an example system 200 that can be utilized to implement a three dimensional user interface in augmented reality, arranged in accordance with at least some embodiments presented herein. As depicted, system 200 may include a spatial locator 252 and a dual eye 3D display 212. Dual eye 3D display 212 may include a first boundary 234 and a second boundary 232. First boundary 234 and second boundary 232 may define a 3D display area 215. Spatial locator 252 may be calibrated to movement of viewer 230 within 3D display area 215. Dual eye 3D display 212 may be configured to generate a first virtual object 220 by generating two or more virtual viewing cones 222 and 224 that, in turn create projected viewing cones 274, 276. Dual eye 3D display 212 may be configured to generate a second virtual object 225 by generating two or more virtual viewing cones 235 and 237 that, in turn, create the projected viewing cones 278, 280. A viewer 230 may be able to view first virtual object 220 and/or second virtual object 225 in 3D display area 215.

At least some of the elements of system 200 may be arranged to be in communication with a processor 254 through a communication link 256. In some examples, processor 254 may be adapted to be in communication with a memory 258 that may include display instructions 260 and jarring and occlusion instructions 262 stored therein. Processor 254 may be configured, such as by display instructions 260 and jarring and occlusion instructions 262, to control at least some of the operations/actions/functions described below.

Processor 254 may, such as by executing display instructions 260, provide instructions to dual eye 3D display 212. In response to the instructions, dual eye 3D display 212 may generate virtual viewing cones 222 and 224 which, in turn, create projected viewing cones 274, 276 and generate first virtual object 220. Similarly, dual eye 3D display 212 may generate virtual viewing cones 235 and 237 that in turn create projected viewing cones 278 and 280 and generate second virtual object 225. Processor 254 may, such as by executing jarring and occlusion instructions 262, and in response to spatial data 268 received from spatial locator 252, detect whether a real object interferes, or travels along a pathway that would interfere, with one or more of the projected viewing cones 274, 276, 278, 280. In one example, a real object may interfere with at least one projected viewing cone corresponding to first virtual object 220. In response to the detection, processor 254 may generate imaging instructions 270 for dual eye 3D display 212. Imaging instructions 270 may effectively modify the generation of first virtual object 220 in 3D display area 215 to account for the interference as described in further detail below.

Figure 5:
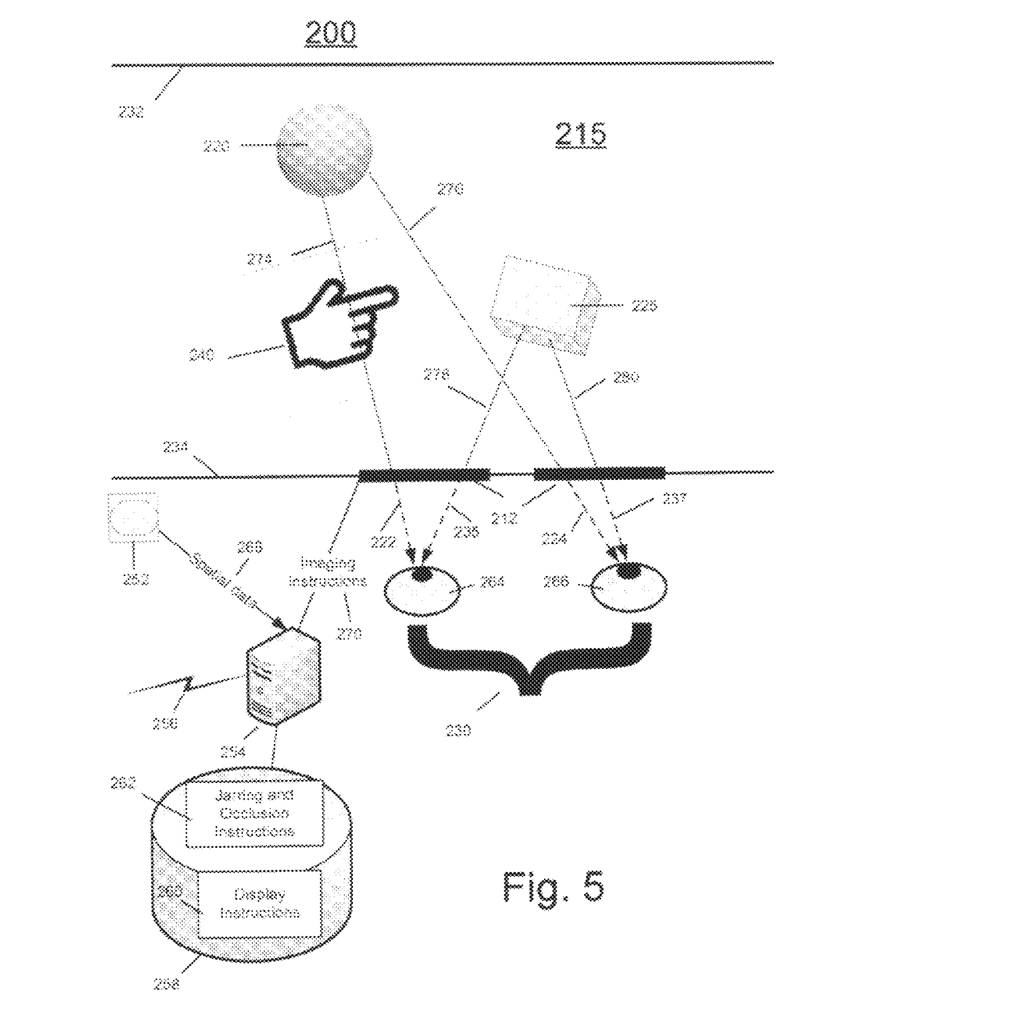
FIG. 5 illustrates the example system of FIG. 4 further illustrating an interfered projected viewing cone.

FIG. 5 illustrates example system 200 further illustrating an interfered projected viewing cone, arranged in accordance with at least some embodiments presented herein. System 200 depicted in FIG. 5 is substantially similar to system 200 of FIG. 4, with additional details. Those components in FIG. 5 that are labeled identically to components of FIG. 4 will not be described again for the purposes of clarity.

In addition to the components described above in FIG. 4, a real object 240 may interface with system 200. Real object 240 may be a hand, a foot, a finger or any other animate or inanimate object. Real object 240 may be used by viewer 230 to point to a virtual object or area within the 3D display area 215. Viewer 230, having two eyes 264, 266, may want to interact with second virtual object 225. For example, viewer 230 may move a hand or any other real object 240 within 3D display area 215 towards second virtual object 225. Spatial locator 252 may detect the location and movement of real object 240 within 3D display area 215 and generate spatial data 268 in response. Processor 254 may receive spatial data 268 and display instructions 260. Display instructions 260 may indicate where projected viewing cones 274, 276, 278, 280 are being generated.

Based on spatial data 168 and display instructions 260, processor 254, may determine that real object 240 is interfering, or travelling along a path that would interfere with, one or more of projected viewing cones 274, 276, 278, 280. For example, real object 240 is shown in the example interfering with projected viewing cone 274 of first virtual object 220. Real object 240 is located between viewer 230, or more specifically viewer eye 264, and first virtual object 220. In response to the determination, processor 254 may execute jarring and occlusion instructions 262. Processor 254 may generate imaging instructions 270 based on spatial data 268, display instructions 260 and jarring and occlusion instructions 262. Imaging instructions 270 may effectively modify the generation of the first virtual object 220 to account for the interference in 3D display area 215 as described in further detail below.

Figure 6:
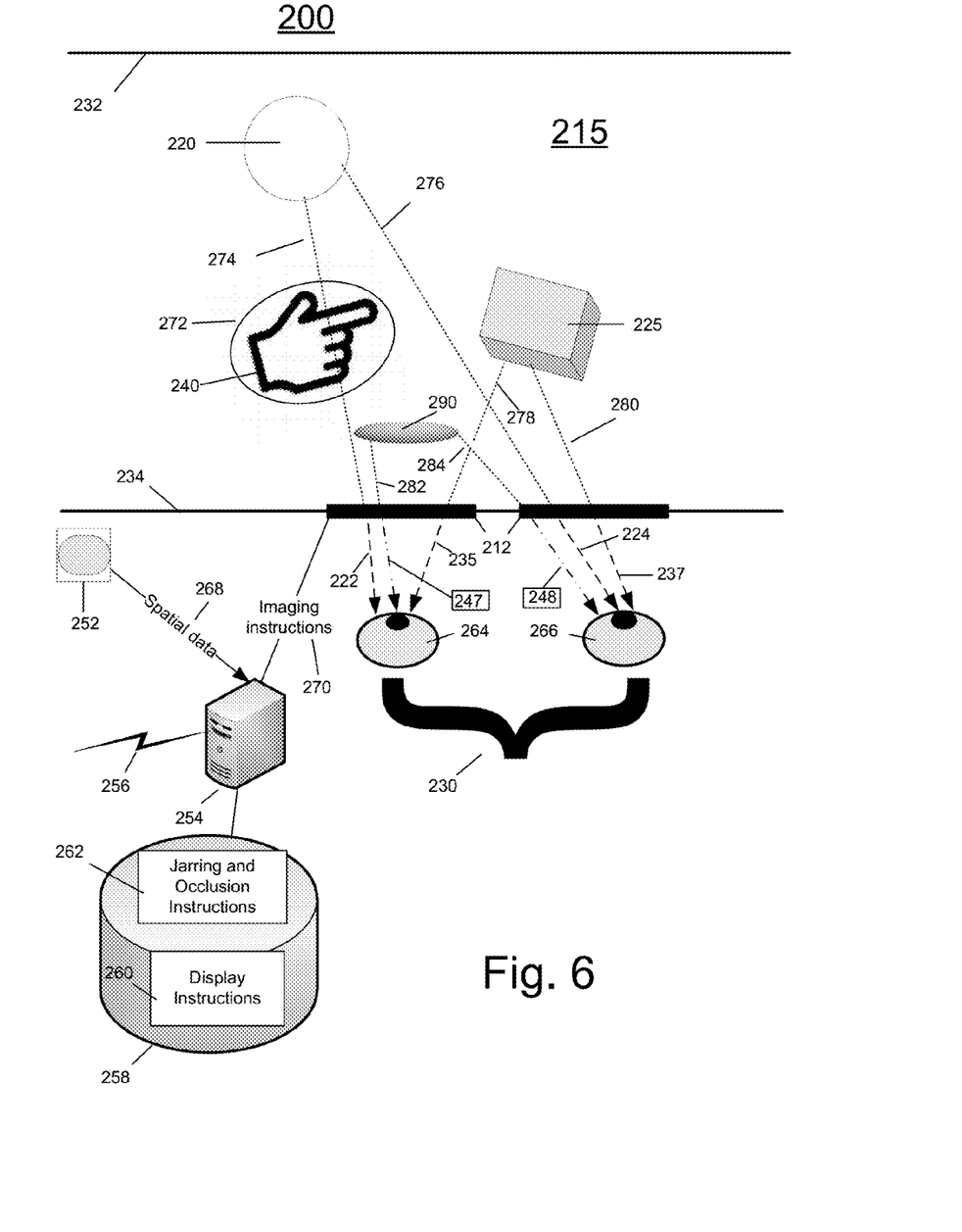
FIG. 6 illustrates the example system of FIG. 4 further illustrating a virtual two dimensional image.

FIG. 6 illustrates example system 200 further illustrating a virtual two dimensional image, arranged in accordance with at least some embodiments presented herein. System 200 depicted in FIG. 6 is substantially similar to system 200 of FIG. 4 and FIG. 5, with additional details. Those components in FIG. 6 that are labeled identically to components of FIG. 4 and FIG. 5 will not be described again for the purposes of clarity.

Based on spatial data 268 and display instructions 260, processor 254, executing jarring and occlusion instructions 262, may determine that real object 240 is interfering with projected viewing cone 274. Processor 254 may identify an interfered visual area 272. Interfered visual area 272 may be identified as being a range of locations in 3D display area 215 where real object 240 is interfering with projected viewing cone 274 plus or including some additional buffer range of locations. Processor 254 may then identify virtual objects whose generation may be affected because of the interference of projected viewing cone 274. In the example, generation of first virtual object 220 is affected.

In contrast, second virtual object 225, may not be identified as an object whose generation is affected by the interference of projected viewing cone 274. Second virtual object 225 may not be identified because second virtual object 225 may be closer to dual eye 3D display 212 than real object 240, and/or second virtual object 225 and projected viewing cones 278, 280 may not be within interfered visual area 272. Processor 254, executing jarring and occlusion instructions 262, may not select second virtual object 225 and not generate imaging instructions 270 to modify the generation of second virtual object 225 in 3D display area 215.

Processor 254 may, such as by executing jarring and occlusion instructions 262, generate imaging instructions 270 to create a virtual object or virtual 2D image 290 corresponding to first virtual object 220. Imaging instructions 270 may cause dual eye 3D display 212 to generate virtual viewing cones 247 and 248 (highlighted with a box). Virtual viewing cones 247 and 248 may, in turn, create projected viewing cones 282, 284. Virtual viewing cones 247 and 248 may generate virtual 2D image 290. Virtual viewing cones 247 and 248 may replace virtual viewing cones 222 and 224. Projected viewing cones 282 and 284 may replace interfered projected viewing cone 274 and projected viewing cone 276.

Virtual viewing cones 247 and 248 may generate virtual 2D image 290 corresponding to first virtual object 220. Virtual 2D image 290 may be closer to dual eye 3D display 212 than real object 240 so as to not be interfered by real object 240. Virtual 2D image 290 may be equivalently scaled to first virtual object 220 or may be scaled bigger or smaller. Imaging instructions 270 may provide dual eye 3D display 212 with instructions for an animation to accompany the generation of virtual 2D image 290.

Among other possible benefits, a three dimensional user interface in augmented reality in accordance with the present disclosure may prevent occlusion paradoxes. Occlusion paradoxes may be caused when a real object is positioned in front of a virtual object, but the virtual object is not occluded by the real object. In augmented reality, the 3D object should be behind the real object and not visible though the real object. Occlusion paradoxes may cause discomfort or headaches for viewers as their eyes oscillate back and forth to focus on the near real object and the farther virtual object. The paradox may also cause eye fatigue. The present disclosure may prevent such eye oscillations.

A system in accordance with the present disclosure also allows the viewer to interact with a virtual object in a three dimensional area and also interact with the modified image in the three dimensional area. The image modification of the interfered virtual object positions the virtual object in a visibly determinate location within the defined three dimensional area. The viewer may avoid experiencing jarring parallax or occlusion paradoxes when viewing the modified virtual object and may have a two dimensional image of the virtual object to interact with. A three dimensional user interface in augmented reality in accordance with the present disclosure can compute interference to multiple viewers.

Figure 7:
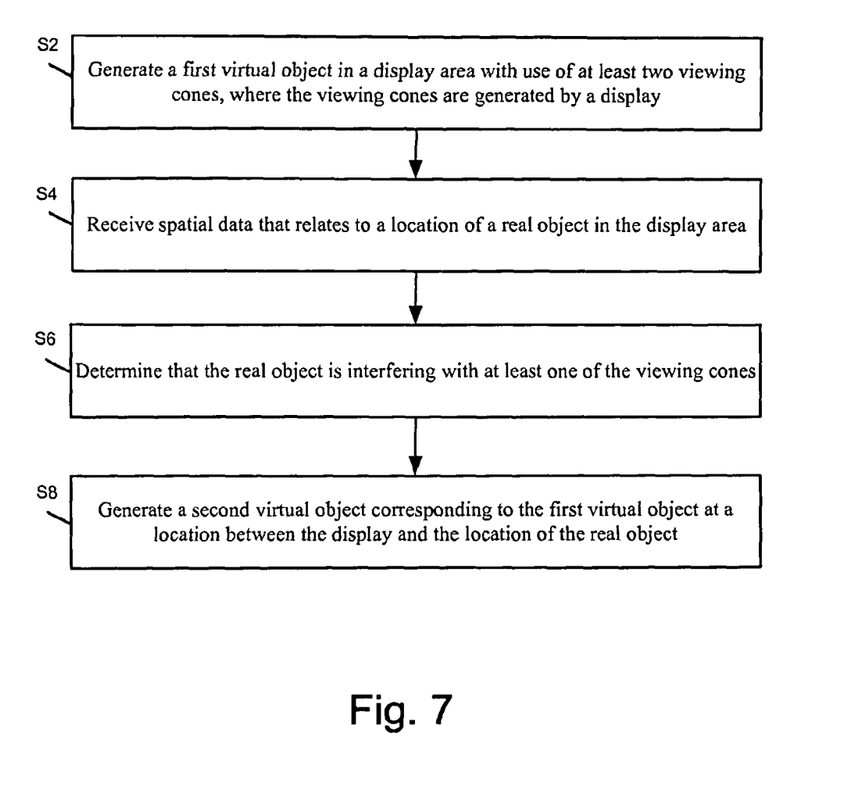
FIG. 7 is a flow diagram illustrating an example process for implementing a three dimensional user interface in augmented reality.

FIG. 7 is a flow diagram illustrating an example process for implementing a three dimensional user interface in augmented reality, arranged in accordance with at least some embodiments presented herein. The process in FIG. 7 could be implemented using, for example, systems 100 or 200 discussed above. The example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Processing may begin at block S2 "Generate a first virtual object in a display area with use of at least two viewing cones, where the viewing cones are generated by a display." At block S2, a processor may generate a first virtual object in a display area. The virtual object may be generated with the use of at least two viewing cones. The viewing cones may be generated by a display. In some examples, the display may be one of a free space three dimensional display or a dual eye three dimensional display.

Processing may continue from block S2 to block S4 "Receive spatial data that relates to a location of a real object in the display area." At block S4, the processor may receive spatial data that relates to a real object in the display area. In some examples, the real object may be a hand, a foot, or a finger used by a viewer to select or interact with an object or area.

Processing may continue from block S4 to block S6 "Determine that the real object is interfering with at least one of the viewing cones." At block S6, the processor may determine that the real object is interfering with at least one of the viewing cones. In some examples, determining the real object is interfering with at least one of the viewing cones may include determining an interfered visual area around the real object.

In some examples, the interfered visual area may include a buffer region around the real object. In some examples, determining that the real object is interfering with at least one of the viewing cones may include determining that the real object is travelling along a path that would interfere with at least one of the viewing cones.

Processing may continue from block S6 to block S8 "Generate a second virtual object corresponding to the first virtual object at a location between the display and the location of the real object." At block S8, the processor may generate a second virtual object corresponding to the first virtual object at a location between the display and the location of the real object.

In some examples, the second virtual object may be a two dimensional image of the first virtual object. In some examples, after generation of the second virtual object, the processor may stop generation of the first virtual object. In some examples, generating the second virtual object may include generating at least two second viewing cones by the display that replace the at least two first viewing cones used to generate the first virtual object. In some examples, the second virtual object may be the same scale as the first virtual object. In some examples the second virtual object may be of a scale that is either bigger or smaller than the first virtual object.

In some examples, generating the second virtual object includes generating an animation. In some examples, the animation includes at least one of compressing the first virtual object, changing a color of the first virtual object, performing a color overlay of the first virtual object, or displaying a movement of the first virtual object to the location of the second virtual object.

Figure 8:
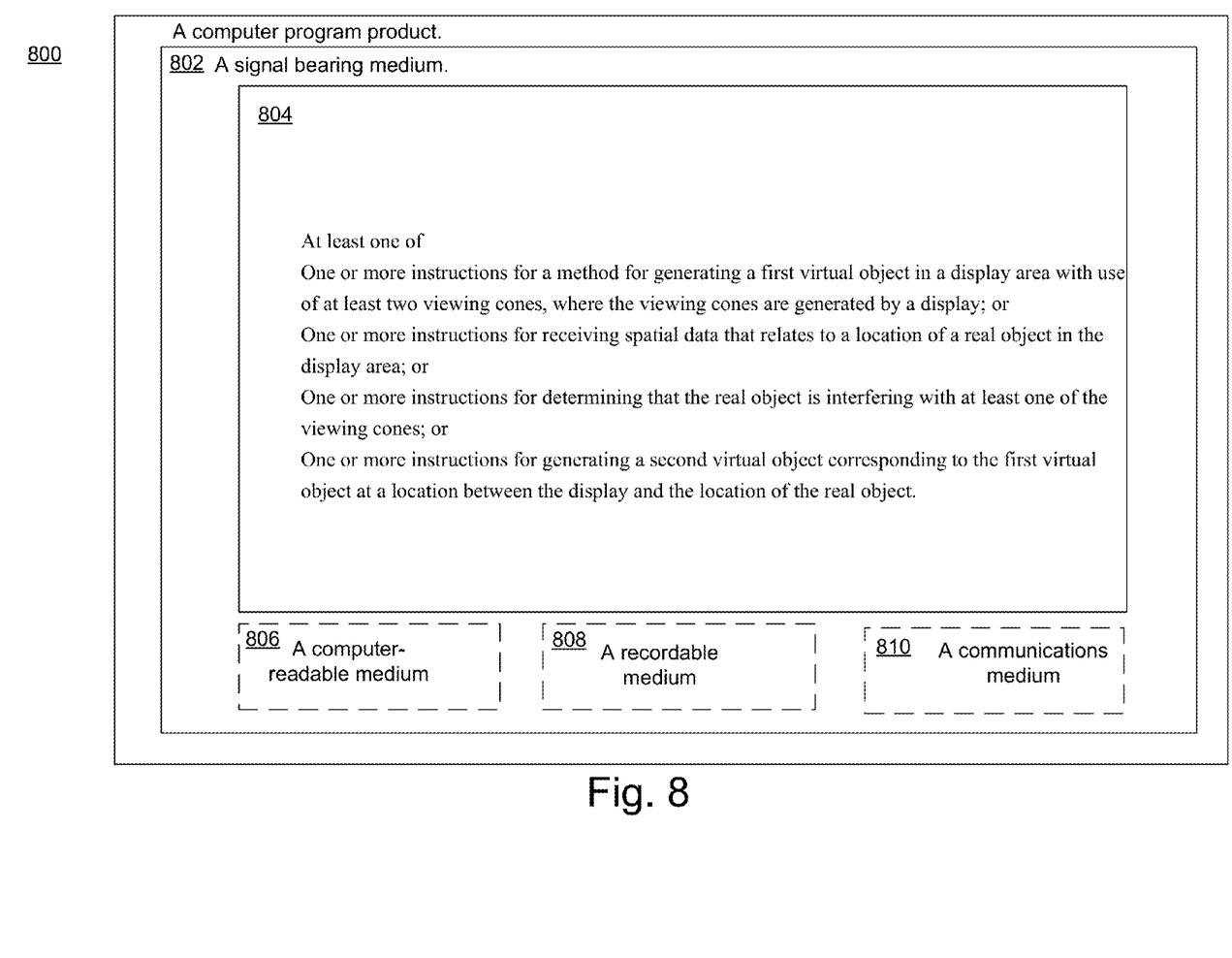
FIG. 8 illustrates a computer program product for implementing a three dimensional user interface in augmented reality.

FIG. 8 illustrates a computer program product 800 for implementing three dimensional user interface in augmented reality, arranged in accordance with at least some embodiments presented herein. Computer program product 800 may include a signal bearing medium 802. Signal bearing medium 802 may include one or more instructions 804 that, when executed by, for example, a processor, may provide the functionality described above with respect to FIGS. 1-7. Thus, for example, referring to systems 100 or 200, processor 154 or 254 may undertake one or more of the blocks shown in FIG. 8 in response to instructions 804 conveyed to the systems 100 or 200 by signal bearing medium 802.

In some implementations, signal bearing medium 802 may encompass a computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, computer program product 800 may be conveyed to one or more modules of the systems 100 or 200 by an RF signal bearing medium 802, where the signal bearing medium 802 is conveyed by a wireless communications medium 810 (e.g., a wireless communications medium conforming with the IEEE 802.11 standard).

Figure 9:
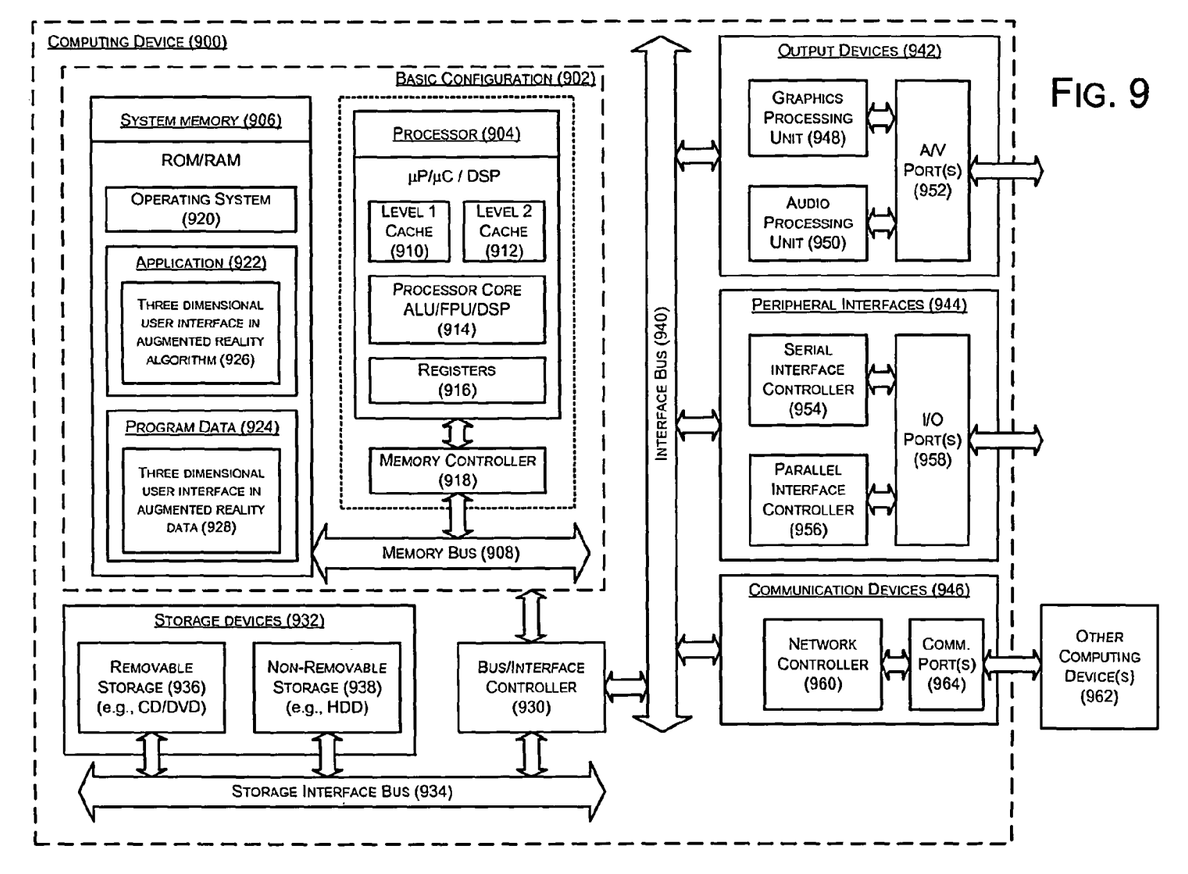
FIG. 9 is a block diagram illustrating an example computing device that is arranged to implement a three dimensional user interface in augmented reality.

FIG. 9 is a block diagram illustrating an example computing device 900 that is arranged to implement three dimensional user interface in augmented reality, arranged in accordance with at least some embodiments presented herein. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (μP), a microcontroller (μC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924.

Application 922 may include a three dimensional user interface in augmented reality algorithm 926 that is arranged to perform the functions as described herein including those described previously with respect to FIGS. 1-7. Program data 924 may include, among other data, three dimensional user interface in augmented reality data 928 that may be useful for a three dimensional user interface in augmented reality algorithm as is described herein. In some embodiments, application 922 may be arranged to operate with program data 924 on operating system 920 such that a three dimensional user interface in an augmented reality system may be provided. This described basic configuration 902 is illustrated in FIG. 9 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate a virtual object, the method comprising, by a processor:
   controlling a free space three dimensional display to generate at least two first viewing cones to generate an image of a first virtual object at a first location of a display area;
   receiving spatial data that relates to a second location of a real object in the display area;
   determining that the real object is between the display and the first location;
   determining that the real object is interfering with at least one of the first viewing cones; and
   controlling the free space three dimensional display to generate at least two second viewing cones to generate an image of a second virtual object corresponding to the first virtual object at a third location of the display area, the third location being different from the first location, wherein the third location is between the display and the location of the real object.

2. The method of claim 1, wherein the second virtual object is a two dimensional image of the first virtual object.

3. The method of claim 1, further comprising stopping generation of the first virtual object.

4. The method of claim 1, wherein determining that the real object is interfering with at least one of the first viewing cones includes determining an interfered visual area around the real object, where the interfered visual area includes a buffer region that surrounds the real object.

5. The method of claim 1, wherein:
   the real object interferes with an interfered area in the display area;
   the first virtual object has a size larger than the interfered area; and
   the second virtual object corresponds to the whole first virtual object.

6. The method of claim 1, wherein:
   the real object interferes with an interfered area in the display area;
   the first virtual object has a size larger than the interfered area; and
   the second virtual object corresponds to a portion of the first virtual object.

7. The method of claim 1, wherein the real object includes one of a hand, a foot, or a finger.

8. The method of claim 1, wherein determining that the real object is interfering with at least one of the first viewing cones includes determining that the real object is travelling along a path that would interfere with at least one of the first viewing cones.

9. The method of claim 1, wherein:
   generating the at least two second viewing cones by the display includes replacing the at least two first viewing cones used to generate the image of the first virtual object.

10. The method of claim 1, wherein the second virtual object is the same scale as the first virtual object.

11. The method of claim 1, wherein the second virtual object is of a scale that is either bigger or smaller than the first virtual object.

12. The method of claim 1, wherein the generating the second virtual object includes generating an animation.

13. The method of claim 12, wherein the animation includes at least one of compressing the first virtual object, changing a color of the first virtual object, performing a color overlay of the first virtual object, or displaying a movement of the first virtual object to the location of the second virtual object.

14. A system effective to generate a virtual object, the system comprising:
   a memory;
   a free space three dimensional display that includes a display area; and
   a processor configured to be in communication with the memory and the display;
   wherein the processor is configured to:
      control the display to generate at least two first viewing cones to generate an image of a first virtual object at a first location of the display area;
      receive spatial data that relates to a second location of a real object in the display area;

determine that the real object is between the display and the first location;

determine that the real object interferes with at least one of the first viewing cones; and control the free space three dimensional display to generate at least two second viewing cones to generate an image of a second virtual object that corresponds to the first virtual object at a third location of the display area, the third location being different from the first location, wherein the third location is between the display and the location of the real object.

15. The system of claim 14, wherein the second virtual object is a two dimensional image of the first virtual object.

16. The system of claim 14, wherein the determination as to whether the real object interferes with at least one of the first viewing cones includes a determination of an interfered visual area around the real object, where the interfered visual area includes a buffer region that surrounds the real object.

17. The system of claim 14, wherein the processor is further effective to generate an animation, wherein the animation includes at least one of compression of the first virtual object, change of a color of the first virtual object, performance of a color overlay of the first virtual object, or display of a movement of the first virtual object to the location of the second virtual object.

18. A system effective to generate a virtual object, the system comprising:

a memory; and a processor configured to be in communication with the memory and the spatial detector;

wherein the processor is configured to:

generate first virtual object data, the first virtual object data effective to control a free space three dimensional display to generate at least two first viewing cones to generate an image of a first virtual object at a first location of the display area, where the first viewing cones are generated by the display;

receive spatial data that relates to a second location of a real object in the display area;

determining that the real object is between the display and the first location;

determine that the real object interferes with at least one of the first viewing cones; and generate second virtual object data, the second virtual object data effective to control the free space three dimensional display to generate at least two second viewing cones to generate an image of a second virtual object in the display area at a third location of the display area, the third location being different from the first location, wherein the third location is between the display and the location of the real object, where the second virtual object corresponds to the first virtual object.

19. The system of claim 18, wherein the second virtual object is a two dimensional image of the first virtual object.

* * * * *